US009613509B2

(12) United States Patent
Ota

(10) Patent No.: US 9,613,509 B2
(45) Date of Patent: Apr. 4, 2017

(54) MOBILE ELECTRONIC DEVICE AND METHOD FOR CRIME PREVENTION

(75) Inventor: Tomokazu Ota, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 1112 days.

(21) Appl. No.: 13/574,850

(22) PCT Filed: Jan. 25, 2011

(86) PCT No.: PCT/JP2011/051356

§ 371 (c)(1), (2), (4) Date: Jul. 24, 2012

(87) PCT Pub. No.: WO2011/090209

PCT Pub. Date: Jul. 28, 2011

(65) Prior Publication Data

US 2012/0293662 A1 Nov. 22, 2012

(30) Foreign Application Priority Data

Jan. 25, 2010 (JP) ................................ 2010-013602

(51) Int. Cl.
*H04N 7/18* (2006.01)
*G08B 13/196* (2006.01)
*G08B 25/10* (2006.01)

(52) U.S. Cl.
CPC .......... *G08B 13/196* (2013.01); *G08B 25/10* (2013.01)

(58) Field of Classification Search
None
See application file for complete search history.

(56) References Cited

U.S. PATENT DOCUMENTS

| | | | | |
|---|---|---|---|---|
| 7,167,575 | B1 * | 1/2007 | Nichani et al. | 382/103 |
| 2005/0002544 | A1 * | 1/2005 | Winter | G08G 1/14 382/104 |
| 2005/0024493 | A1 * | 2/2005 | Nam | G08B 13/19619 348/143 |
| 2007/0216765 | A1 * | 9/2007 | Wong | H04N 5/23212 348/46 |

FOREIGN PATENT DOCUMENTS

| | | | |
|---|---|---|---|
| JP | 737063 | A | 2/1995 |
| JP | 944759 | A | 2/1997 |
| JP | 2002208073 | A | 7/2002 |
| JP | 2006162372 | A | 6/2006 |

(Continued)

OTHER PUBLICATIONS

International Search Report and Written Opinion for PCT/JP2011/051356, dated Apr. 19, 2011.

(Continued)

*Primary Examiner* — Heather Jones
(74) *Attorney, Agent, or Firm* — Hauptman Ham, LLP

(57) ABSTRACT

According to an aspect, a mobile electronic device includes a light-emitting unit and a control unit. The light-emitting unit emits light. The control unit performs control such that a predetermined operation is executed when a variation between first information and second information is greater than a threshold. The first information and the second information are obtained with respect to an area to which the light-emitting unit emits the light.

22 Claims, 8 Drawing Sheets

(56) References Cited

FOREIGN PATENT DOCUMENTS

| | | | |
|---|---|---|---|
| JP | 2007265021 | A | 10/2007 |
| JP | 2008199417 | A | 8/2008 |
| JP | 2009294974 | A | 12/2009 |

OTHER PUBLICATIONS

Office Action mailed Oct. 14, 2014, corresponding to Japanese patent application No. 2010-013602, for which an explanation of relevance is attached.

Office Action mailed Mar. 25, 2014, corresponds to Japanese patent application No. 2010-013602, for which an explanation of relevance is attached.

* cited by examiner

MOBILE ELECTRONIC DEVICE AND METHOD FOR CRIME PREVENTION

RELATED APPLICATIONS

This application is a National Stage of PCT international application Ser. No. PCT/JP2011/051356 filed on Jan. 25, 2011 which designates the United States, and which is based upon and claims the benefit of priority from Japanese Patent Application No. 2010-013602, filed on Jan. 25, 2010.

FIELD

The present disclosure relates to a mobile electronic device with crime prevention function and a method for crime prevention.

BACKGROUND

Conventionally, there are known devices to deter a suspicious person from entering into premises. As such a device, for example, Patent Literature 1 discloses a device which can readily deter a suspicious person from entering in to house whose resident is away by randomly outputting (reproducing) audio or video from various kinds of sources including sound of daily living activities and received information of broadcast programs.

CITATION LIST

Patent Literature

Patent Literature 1: Japanese Patent Application Laid-Open No. 2007-265021

Technical Problem

The device described in Patent Literature 1 outputs sound or the like at random timing. That is, the device described in Patent Literature 1 might output sound or the like even when there are no suspicious persons around the premises. Therefore, the device described in Patent Literature 1 may waste electric power because it alarms even at unnecessary timing. Moreover, if such an alarming is frequently activated even at unnecessary timing, residents living near the house provided with the device disclosed in Patent Literature 1 may feel noisy about the sound generated by the device disclosed in Patent Literature 1.

For the foregoing reasons, there is a need for a mobile electronic device for crime prevention and a method for crime prevention that can be used easily.

SUMMARY

According to an aspect, a mobile electronic device includes: a light-emitting unit for emitting light; a detecting unit for detecting a distance to a subject in an area to which the light-emitting unit emits the light; and a control unit for performing control such that a predetermined operation is executed when a variation of information on a second distance detected by the detecting unit with respect to information on a first distance that is set in advance is greater than a threshold.

According to another aspect, the control unit performs control in crime prevention mode, and the information on the first distance is information on a distance detected when execution of the crime prevention mode is started.

According to another aspect, the second distance is detected for each of divided sections obtained by dividing an image area imaged by an imaging unit into a plurality of divided sections, and the control unit determines whether the variation is greater than the threshold for each of the divided sections, and performs the control such that the predetermined operation is performed when the variation is greater than the threshold for any one of the divided sections.

According to another aspect, the control unit causes the light-emitting unit to emit light to the divided section in which the variation is greater than the threshold as the predetermined operation.

According to another aspect, a mobile electronic device includes: a light-emitting unit for emitting light, an imaging unit for imaging an area to which the light-emitting unit emits the light, and a control unit for performing control such that a predetermined operation is performed when a variation between a first image which is set beforehand and a second image imaged by the imaging unit is greater than a threshold.

According to another aspect, the control unit performs control in crime prevention mode, and the first image is an image imaged when execution of the crime prevention mode is started.

According to another aspect, the light-emitting unit projects the light to project a predetermined image.

According to another aspect, the control unit sets the predetermined image projected by the light-emitting unit as the first image.

According to another aspect, the light-emitting unit projects the predetermined image with invisible light.

According to another aspect, the imaging unit performs imaging randomly or at constant time intervals.

According to another aspect, the contact time interval is set to be shorter when the mobile electronic device is externally powered than when the mobile electronic device is not externally powered.

According to another aspect, the mobile electronic device further includes a storage unit. The control unit causes the storage unit to store the second image imaged by the imaging unit.

According to another aspect, the storage unit is controlled such that the second image imaged when the variation is greater than the threshold is stored and the second image imaged when the variation is not greater than the threshold is not stored from the first.

According to another aspect, the storage unit is controlled such that the second image in which the variation is not greater than the threshold is deleted after a given time elapses if the variation does not become greater than the threshold within the given time.

According to another aspect, the imaging unit is able to continuously perform imaging, and the second image is a moving image.

According to another aspect, the mobile electronic device further includes a sound collecting unit for acquiring sound. The sound collecting unit is controlled such that, when the variation becomes greater than the threshold, the sound is collected from since that.

According to another aspect, the mobile electronic device further includes a communicating unit. The communicating unit performs communication when the variation becomes greater than the threshold. According to another aspect, a method for crime prevention includes: emitting light to an area by a light-emitting unit; obtaining first information with respect to the area; obtaining second information with respect to the area; and performing control such that a predetermined operation is executed when a variation between the first information and the second information is greater than a threshold.

Advantageous Effects of Invention

Thanks to the mobile electronic device and the method for crime prevention according to the present invention, a device for crime prevention and the method for crime prevention that can be used easily are provided.

DESCRIPTION OF EMBODIMENTS

Hereinafter, the present invention will be described in detail with reference to the accompanying drawings. The present invention is not limited by the description herein below. Moreover, components to be described below encompass components that can be easily considered by those skilled in the art, components that are substantially the same as those components, and so-called equivalents of the components. In the following description, a mobile phone is described as an example of a mobile electronic device. However, objects to which the present invention can be applied are not limited thereto. For example, the present invention can be applied to PHSs (Personal Handy phone Systems), or camera-equipped projectors.

(First Embodiment)

Figure 1:
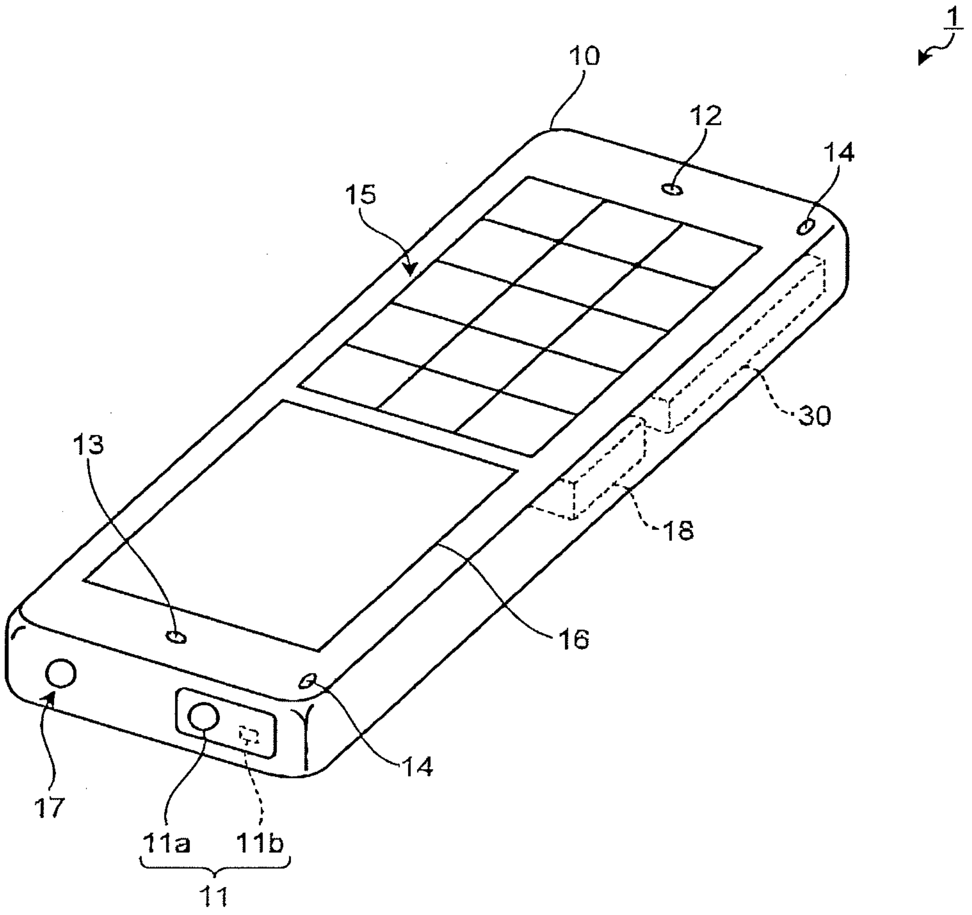
FIG. 1 is a perspective view illustrating the appearance of a mobile phone.

FIG. 1 is a perspective view illustrating the appearance of a mobile phone. There may be cases where the sizes or arrangement positions of respective devices illustrated in each of the drawings are different from actual sizes or arrangement positions. The mobile phone 1 illustrated in FIG. 1 includes a housing 10, an imaging unit 11, a microphone 12, a receiver 13, a speaker 14, an operating unit 15, a display unit 16, a projector 17 serving as a light-emitting unit, a vibrator 18, and a control unit 30. The housing 10 according to the present embodiment is a straight type housing, for example, including one box-like body. The housing 10 may be configured to include two housings including a first housing and a second housing. In this case, the housing 10 may be a sliding-type housing structured such that the first housing slides on the second housing or a foldable housing in which the first housing is turned relative to the second housing. That is, the structure of the housing 10 is not particularly limited.

All of the imaging unit 11, the microphone 12, the receiver 13, the speaker 14, the operating unit 15, the display unit 16, the projector 17, the vibrator 18, and the control unit 30 are encased in the housing 10. Each of the imaging unit 11, the microphone 12, the receiver 13, the speaker 14, the operating unit 15, the display unit 16, the projector 17, and the vibrator 18 is electrically connected to the control unit 30. The control unit 30 includes a CPU (Central Processing Unit), and integrally controls the overall operation of the mobile phone 1. The imaging unit 11 includes an image sensor 11*a* and a focal length detecting unit 11*b*. The image sensor 11*a* images a subject (for example, a floor or a wall) existing within an imaging area.

Figure 2:
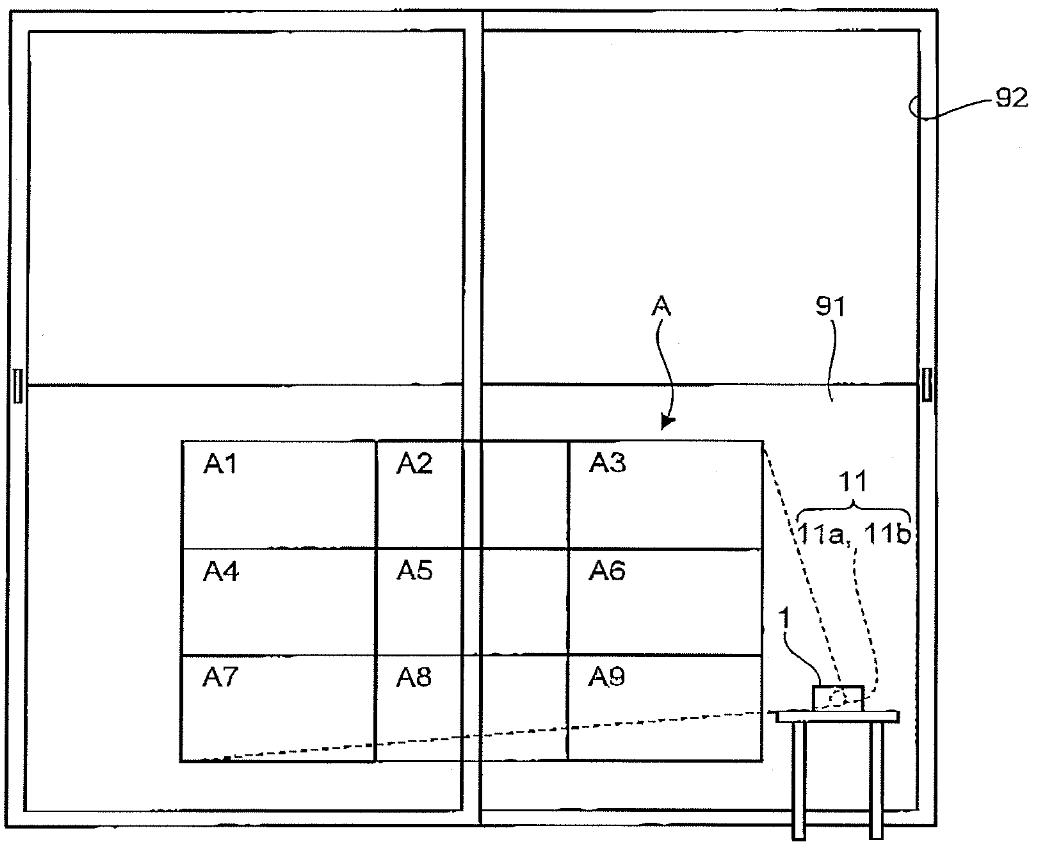
FIG. 2 is an explanatory diagram illustrating a monitoring area before a projector emits light.

FIG. 2 is an explanatory diagram illustrating a monitoring area before a projector emits light. The mobile phone 1 is put, for example, indoors. The image sensor 11*a* images an outdoor wall 91 (for example, balcony) through a window 92. Among portions of the wall 91, a range to be imaged by the image sensor 11*a* is referred to as an imaging area A. The subject to be imaged by the image sensor 11*a* is not limited to the outdoor wall, and may be an indoor wall. The subject to be imaged by the image sensor 11*a* is not limited to the walls, but may be a floor, for example. The mobile phone 1 may be put outdoors.

The focal length detecting unit 11*b* detects a focal length which is a distance between itself (the focal length detecting unit 11*b*) and the subject. The focal length detecting unit 11*b* according to the present embodiment detects the focal length by a passive method, for example. The passive method is a method by which the focal length is detected without using infrared radiation or ultrasonic waves but using an image captured with use of a lens. The focal length detecting unit 11*b* causes the image sensor 11*a* to image a plurality of images with different focal lengths by changing the focal length. Subsequently, the focal length detecting unit 11*b* compares the plurality of images imaged by the image sensor 11*a* with one another and as a result detects the focal length. More specifically, the focal length detecting unit 11*b* compares the sharpness of a characteristic portion (edge portion) of each of the plurality of images with that of another image to detect the focal length. In a case where the focal length is detected by the passive method, the focal length detecting unit 11*b* detects the characteristic portion of the subject existing within the imaging area A so that the focal length detecting unit 11*b* can detect the distance from itself (the focal length detecting unit 11*b*) to the characteristic portion of the subject.

The focal length detecting unit 11*b* according to the present embodiment divides the imaging area A into a plurality of divided sections and detects the focal length for each of the divided sections. The focal length detecting unit 11*b* according to the present embodiment divides the imaging area A, for example, into nine divided sections including divided sections A1 to A9. The control unit 30 illustrated in FIG. 1 calculates information with respect to the focal length detected by the focal length detecting unit 11*b* for each of the divided sections. Specifically, the control unit 30 acquires detection signals corresponding to the focal lengths from the focal length detecting unit 11*b*, and calculates an integrated value of the detection signals as focal length information. Subsequently, the control unit 30 adjusts the focus for imaging to be performed by the image sensor 11*a* based on the focal length information when an image of the imaging area A is acquired. Then, the control unit 30 causes the image sensor 11*a* to image the imaging area A and acquires an image from the image sensor 11*a*.

The microphone 12 converts sound into an electric signal. The control unit 30 acquires the sound which is in the form of an electric signal, from the microphone 12. Each of the receiver 13 and the speaker 14 converts the electric signal output from the control unit 30 into sound and then outputs the sound. The speaker 14 can output louder sound than the receiver 13. The operating unit 15 is installed, for example, such that buttons thereof are exposed outside the housing 10. The operating unit 15 is operated by the user of the mobile phone 1. The control unit 30 acquires information which is input through the operating unit 15 by the user. The display unit 16 displays an image based on the signal received from the control unit 30.

The projector 17 is installed such that a portion of the projector 17 from which light is emitted is exposed outside the housing 10. The projector 17 emits light based on the signal received from the control unit 30 so that an image can be displayed on a projection plane at which the emitted light arrives. The vibrator 18 includes, for example, a motor and a bob which is coupled to the motor such that its center is shifted from an output shaft of the motor. The vibrator 18 vibrates as the output shaft of the motor rotates when the electric power is supplied to the motor. The vibration of the vibrator 18 is transferred to the housing 10 so that the housing 10 will vibrate.

Figure 3:
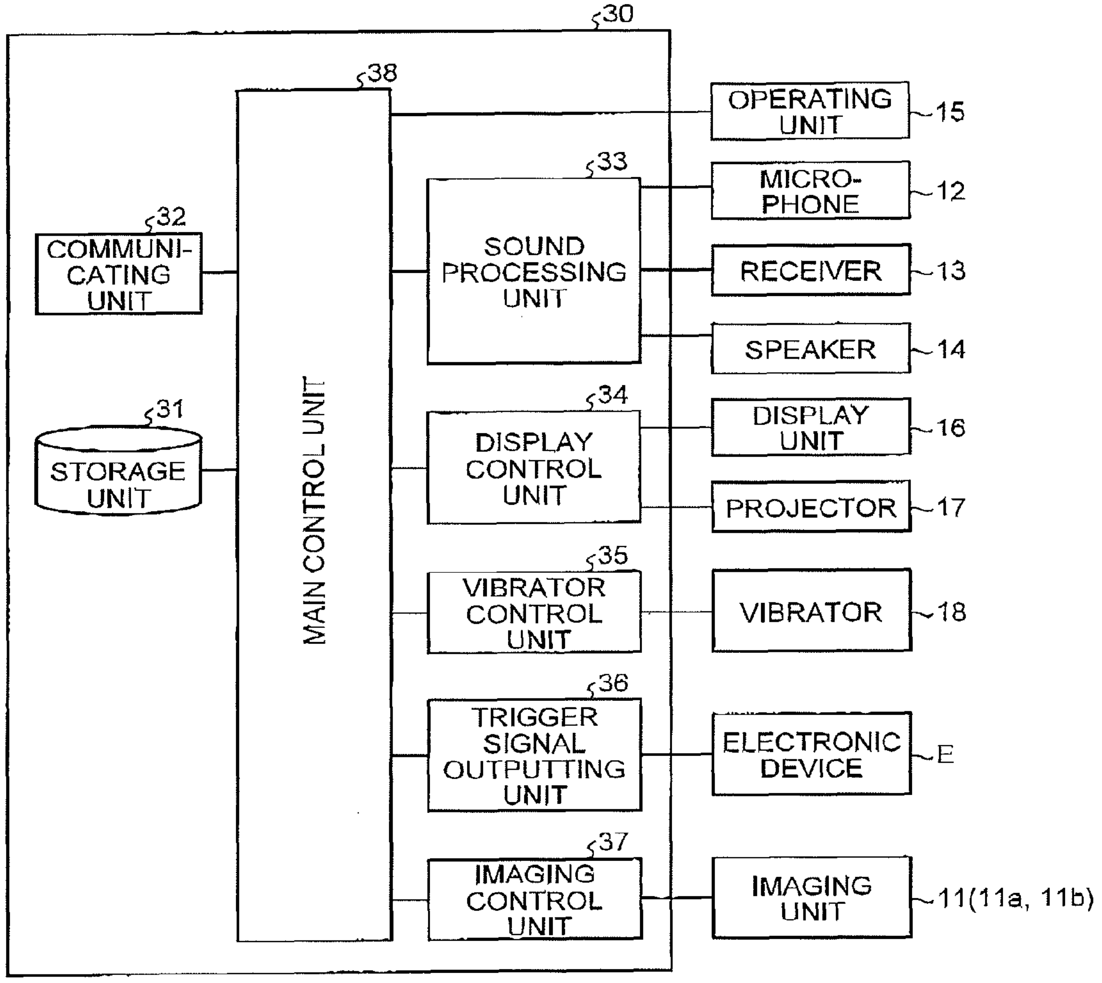
FIG. 3 is a block diagram illustrating functions of a control unit.

FIG. 3 is a block diagram illustrating functions of the control unit. The control unit 30 implements all of the functions illustrated in FIG. 3 in the form of a single device, or in the form of a plurality of devices which implements the functions illustrated in FIG. 3, respectively, and is electrically connected to each other. The control unit 30 implements each of the functions of a storage unit 31, a communicating unit 32, a sound processing unit 33, a display control unit 34, a vibrator control unit 35, a trigger signal outputting unit 36, an imaging control unit 37, and a main control unit 38. The storage unit 31 stores a series of procedures (computer program) to be executed by the control unit 30, or information necessary to execute the series of procedures. The communicating unit 32 implements communication with other electronic devices. Specifically, the communicating unit 32 transmits mails that the user has composed, receives mails transmitted from other mobile phones, or receives sound data for voice communication. The communicating unit 32 according to the present embodiment can transmit the signal which has been stored in the storage unit 31.

The sound processing unit 33 acquires the signal from the microphone 12 and transmits the signal to each of the receiver 13 and the speaker 14. Specifically, the sound processing unit 33 acquires sound data which has been converted to an electric signal by the microphone 12. Moreover, the sound processing unit 33 outputs the signal to at least one of the receiver 13 and the speaker 14 so that either the receiver 13 or the speaker 14, to which the signal is transmitted, can output the sound. The display control unit 34 produces an image to be displayed on the display unit 16. Then, the display control unit 34 outputs the produced image to the display unit 16 as a signal. Moreover, the display control unit 34 adjusts light emitted from the projector 17. Specifically, the display control unit 34 adjusts colors or amounts of light components contained in the light emitted from the projector 17 so that the image to be displayed by the projector 17 can be adjusted.

The vibrator control unit 35 adjusts timing when to start supplying power to the vibrator 18 or timing when to stop supplying power to the vibrator 18. Moreover, the vibrator control unit 35 adjusts the magnitude of the electric power (for example, the magnitude of electric current) supplied to the motor of the vibrator 18 to adjust the magnitude of the vibration of the vibrator 18.

The trigger signal outputting unit 36 outputs the signal which is transmitted to an electronic device E other than the mobile phone 1. The signal which is output by the trigger signal outputting unit 36 is referred to as a trigger signal. Examples of the electronic device E other than the mobile phone 1 include a television, an audio device, a lighting apparatus for illuminating a room, or a personal computer. The trigger signal is a signal used to control these devices.

The trigger signal is, for example, a signal for starting up a television, a signal for starting up an audio device to output sound, a signal for turning on a lighting apparatus to illuminate, or a signal for initiating lock state of a personal computer. The trigger signal is stored in the storage unit 31 in advance. For example, the trigger signal is registered by a user. An example of a method which allows a user to register the trigger signal in the mobile phone 1 will be described. When registering the signal for starting up a television as the trigger signal, the user holds a remote control of the television such that the remote control of the television is directed toward an infrared ray transmitting/receiving unit provided in the mobile phone 1. Then, the user presses a start-up button of the remote control. The trigger signal outputting unit 36 acquires the signal which the infrared ray transmitting/receiving unit has acquired. Then, the storage unit 31 stores this signal as the trigger signal.

The imaging control unit 37 controls the operation of the imaging unit 11. Specifically, the imaging control unit 37 acquires a detection signal corresponding to the focal length, from the focal length detecting unit 11*b*. The imaging control unit 37 adjusts the focus for imaging to be performed by the image sensor 11*a* based on this detection signal. The main control unit 38 integrally controls each of the units, including from the storage unit 31 to the imaging control unit 37, and also implements a different function from the respective units, including from the storage unit 31 to the imaging control unit 37. For example, the main control unit 38 acquires necessary information from the storage unit 31, causes the storage unit 31 to store information, or acquires user's operation which is input through the operating unit 15 as a signal. The main control unit 38 executes the series of procedures (program) stored in the storage unit 31, and performs processing necessary to execute the series of procedures.

Next, the series of procedures to be executed by the control unit 30 in the crime prevention mode will be described. The crime prevention mode is an operation mode of the mobile phone 1 to promote crime prevention. The storage unit 31 stores two procedures including a preliminary procedure and a crime prevention procedure as the series of procedures used when the crime prevention mode is executed. The preliminary procedure is a procedure which is occasionally executed prior to the crime prevention procedure. The mobile phone 1 according to the present embodiment allows the user to specify whether the control unit 30 should execute the preliminary procedure. That is, the control unit 30 can execute the crime prevention procedure without executing the preliminary procedure. The preliminary procedure will be described first.

Figure 4:
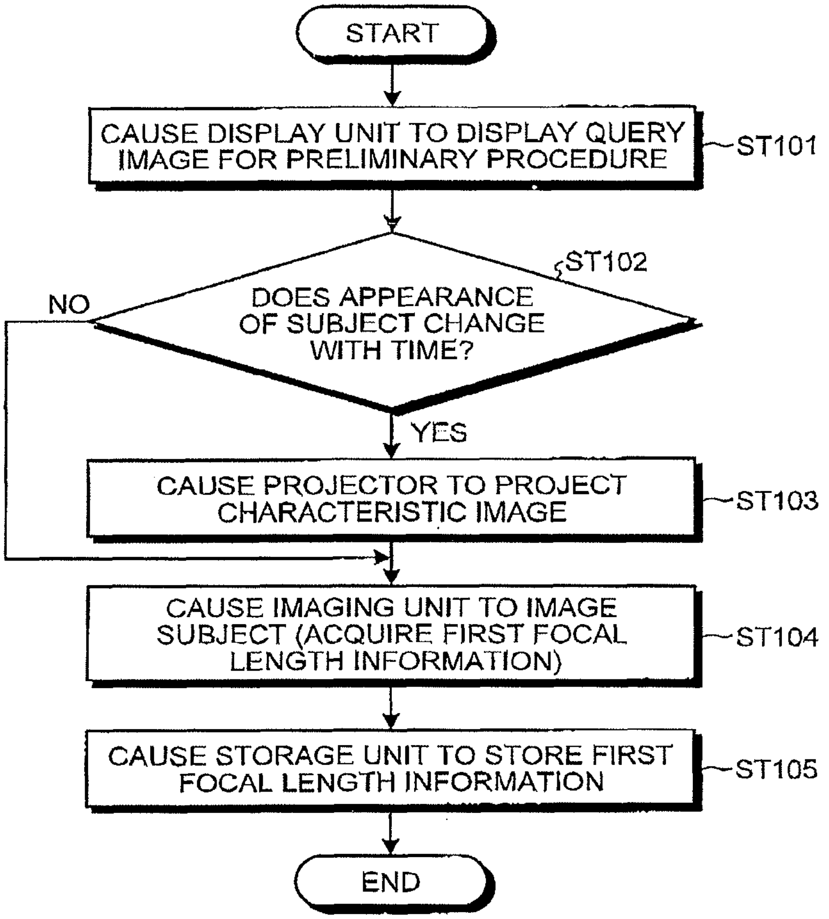
FIG. 4 is a flowchart illustrating a preliminary procedure.

FIG. 4 is a flowchart illustrating the preliminary procedure. At Step ST101, the display control unit 34 causes the display unit 16 to display a query image for the preliminary procedure. The query image for the preliminary procedure is an image for asking whether a subject within the imaging area A illustrated in FIG. 2 easily changes with time. For example, when the subject within the imaging area A moves with time, or the shadow of the subject or the shadow casted to the imaging area A changes in shape with time, such a subject comes under the subject which easily changes with time. The display unit 16 displays, for example, a text image with text like "Does the appearance of a subject in an imaging area A changes with time?". The user sees the query image for the preliminary procedure, and inputs an operation of specifying an answer to the question of whether the appearance of the subject changes with time, to the operating unit 15 illustrated in FIG. 1. Subsequently, at Step ST102 illustrated in FIG. 4, the main control unit 38 determines whether the appearance of the subject changes with time based on the signal acquired from the operating unit 15.

Figure 5:
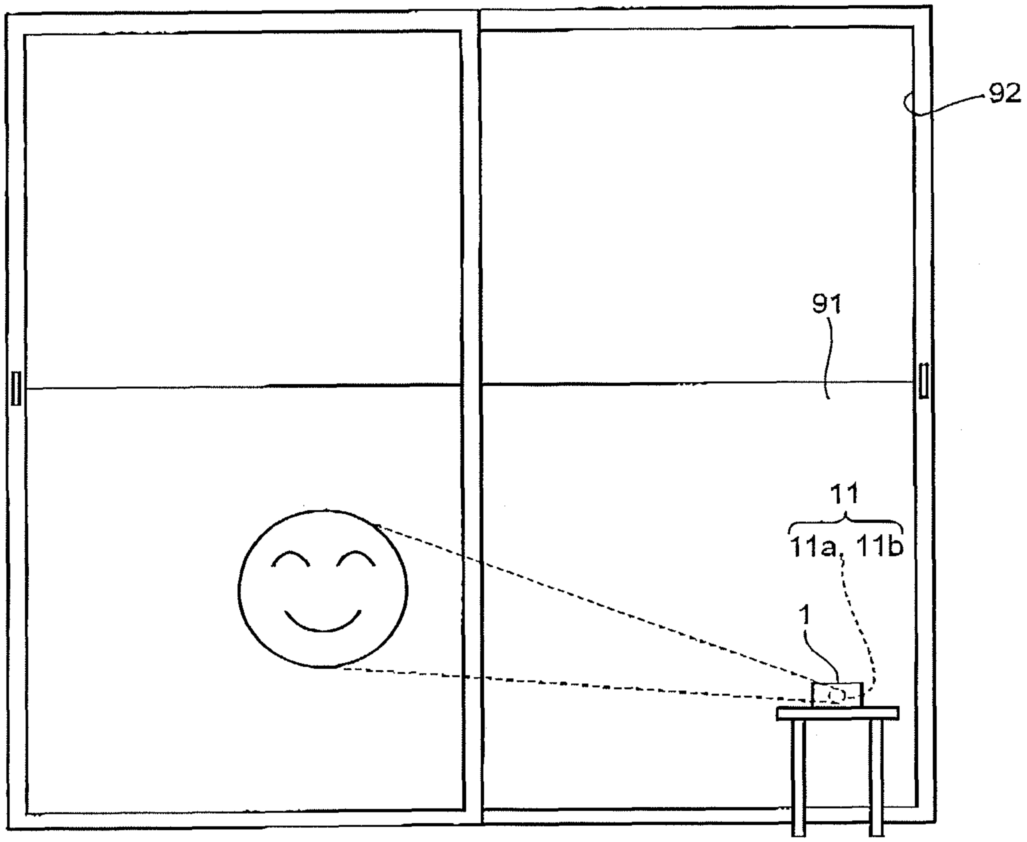
FIG. 5 is an explanatory diagram illustrating a state in which a characteristic image is projected on a wall.

FIG. 5 is an explanatory diagram illustrating a state in which a characteristic image is projected on a wall. When the main control unit 38 determines that the appearance of the subject changes with time (Yes in Step ST102), the control unit 30 proceeds to Step ST103. At Step ST103, the display control unit 34 causes the projector 17 to project the characteristic image. The characteristic image refers to an image as illustrated in FIG. 5. The characteristic image is an image in which the boundary between different colors is clear. In other words, the characteristic image is an image in which colors do not change gradually like gradations of colors but the colors rapidly change. That is, the characteristic image may be an image which includes a so-called edge.

When the main control unit 38 determines that the appearance of the subject does not change with time (No in Step ST102) or when Step ST103 is executed, the control unit 30 proceeds to Step ST104. At Step ST104, the imaging control unit 37 causes the image sensor 11*a* to image the subject. In the imaging unit in which focusing for imaging by the image sensor is automatically performed, in other words, in the imaging unit having so-called auto focus function, when the image sensor 11*a* starts imaging the subject, the focal length detecting unit 11*b* detects the focal lengths. In this way, the imaging control unit 37 can acquire an image of the subject imaged by the image sensor 11*a*, and calculate the focal length information (integrated value) based on the focal lengths acquired from the focal length detecting unit 11*b*. The calculated focal length information is referred to as first focal length information. At Step ST104, the imaging control unit 37 may not image the subject with use of the image sensor 11*a* but may only calculate the first focal length information with use of the focal length detecting unit 11*b*. Subsequently, at Step ST105, the storage unit 31 stores the first focal length information. When Step ST105 is executed, the control unit 30 ends the execution of the series of procedures.

Figure 6:
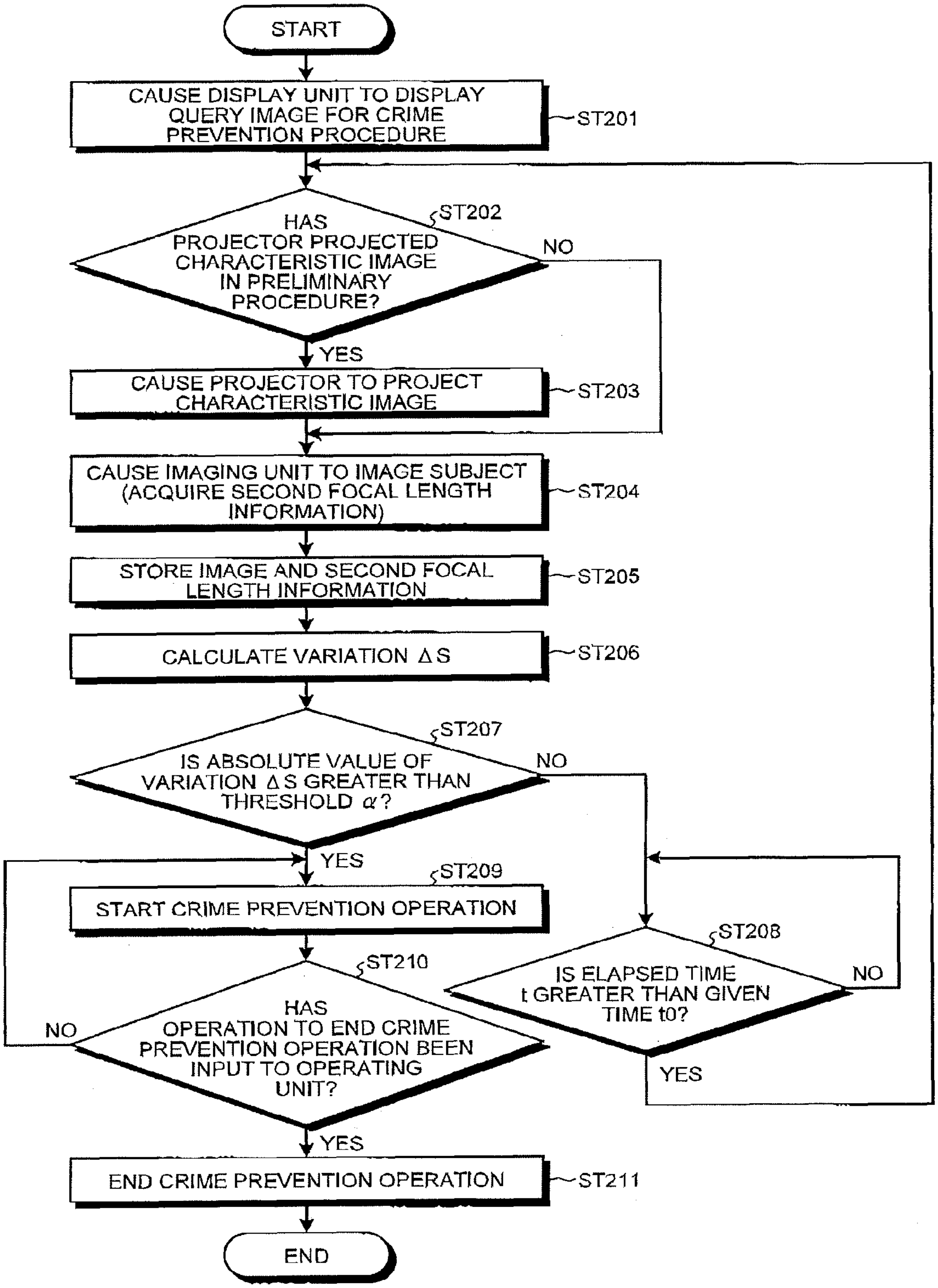
FIG. 6 is a flowchart illustrating a crime prevention procedure according to a first embodiment.

FIG. 6 is a flowchart illustrating the crime prevention procedure according to the first embodiment. At Step ST201, the display control unit 34 causes the display unit 16 to display the query image for the crime prevention procedure. The query image for the crime prevention procedure is an image for asking whether Step ST103 illustrated in FIG. 4 has been executed, that is, whether the display control unit 34 has caused the projector 17 to project the characteristic image. The display unit 16 displays a text image with text like "Has a characteristic image been projected?", for example. The user sees the query image for the crime prevention procedure, and performs an operation of answering the question of whether the projector 17 has projected the characteristic image in the preliminary procedure, to the operating unit 15 illustrated in FIG. 1. Subsequently, at Step ST202, the main control unit 38 determines whether the projector 17 has projected the characteristic image in the preliminary procedure based on the signal acquired from the operating unit 15.

The main control unit 38 does not necessarily make a determination on whether the projector 17 has projected the characteristic image in the preliminary procedure based on the signal acquired from the operating unit 15. For example, the storage unit 31 stores information on whether the projector 17 has projected the characteristic image in the preliminary procedure while the control unit 30 is executing the preliminary procedure. In the crime prevention procedure, the main control unit 38 acquires this information from the storage unit 31 and determines whether the projector 17 has projected the characteristic image in the preliminary procedure. In this case, the display control unit 34 may not execute Step ST201.

When the main control unit 38 determines that the projector 17 has projected the characteristic image in the preliminary procedure (Yes in Step ST202), the control unit 30 proceeds to Step ST203. At Step ST203, the imaging control unit 37 causes the projector 17 to project the same characteristic image as the characteristic image which is projected by the projector 17 in the preliminary procedure. That is, the display control unit 34 executes the same procedure as the preliminary procedure illustrated in FIG. 4. When the main control unit 38 determines that the projector 17 has not projected the characteristic image in the preliminary procedure (No in Step ST202) or when Step ST203 is executed, the control unit 30 proceeds to Step ST204. At Step ST204, the imaging control unit 37 images the subject with use of the image sensor 11*a*. As a result, the imaging control unit 37 acquires not only the image produced by imaging the subject but also the focal lengths to calculate second focal length information.

Subsequently, at Step ST205, the storage unit 31 stores the image imaged by the image sensor 11*a* and the second focal length information. Subsequently, at Step ST206, the main control unit 38 acquires the first focal length information and the second focal length information from the storage unit 31, and subtracts the second focal length information from the first focal length information to calculate a variation ΔS, which is a difference between the integrated values. Suppose that the subject is, for example, a wall, or a characteristic image projected on the wall. In this case, the first focal length is set to a distance from the focal length detecting unit 11*b* to the wall. Under such a condition, the focal length decreases when a person (suspicious person) shades the subject. As a result, the variation ΔS becomes a positive value. Alternatively, suppose that the subject is, for example, a door or a characteristic image projected on the door. In this case, the first focal length is set to a distance from the focal length detecting unit 11*b* to the door. Under such a condition, the focal length increases when a person (suspicious person) opens the door. As a result, the variation ΔS becomes a negative value. In both cases, the main control unit 38 calculates the variation ΔS in the focal length as a change in the subject within the imaging area.

Subsequently, in Step ST207, the main control unit 38 determines whether the absolute value of the variation ΔS is greater than a threshold α. As for the value to be compared with the threshold α, it is not limited to the absolute value of the variation ΔS, and it may be the variation ΔS. In such a case, the main control unit 38 determines whether the variation ΔS is greater than the threshold α. Hereinafter, the threshold α will be described.

Figure 7:
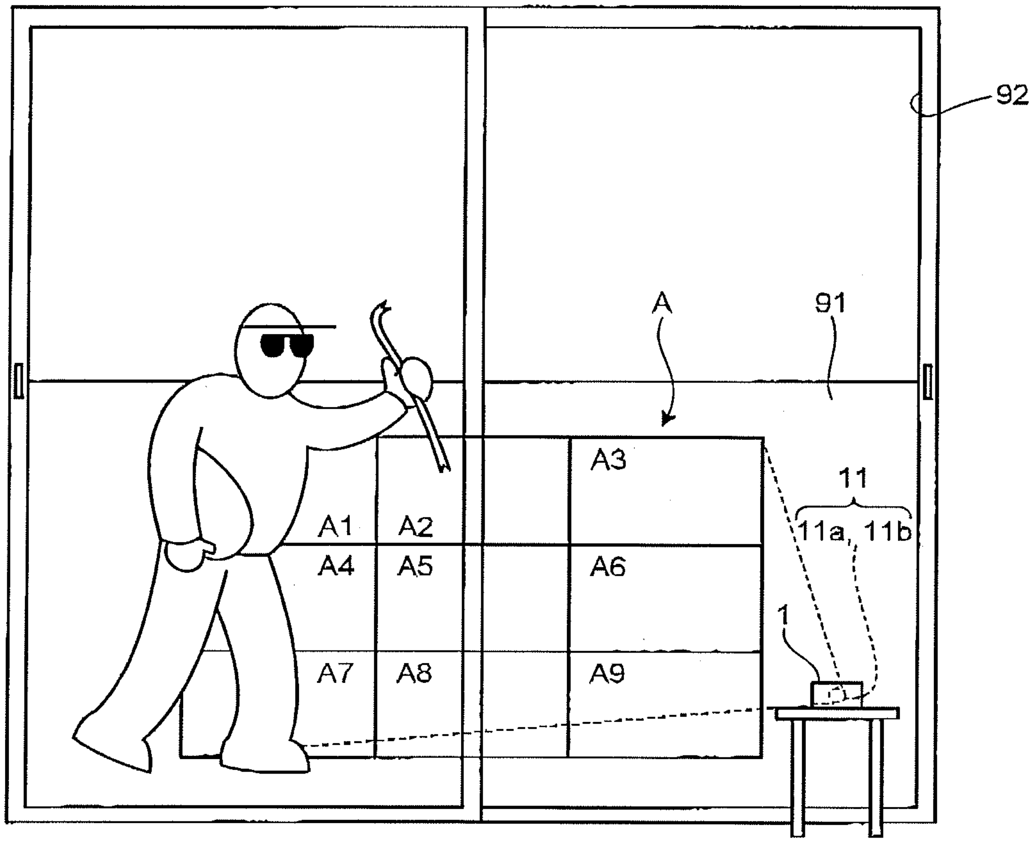
FIG. 7 is an explanatory diagram illustrating a state in which a person enters an imaging area.

FIG. 7 is an explanatory diagram illustrating a state in which a person enters the imaging area. The focal length of at least one divided section out of the divided sections, including from the divided section A1 to the divided section A9, changes when a person (for example, suspicious person) enters the imaging area A as illustrated in FIG. 7. In FIG. 7, a person appears in the divided section A1, the divided section A4, and the divided section A7. Therefore the focal length for each of the divided sections A1, A4, and A7 changes. Consequently, the focal length information (integrated values) of the divided sections with the person having been entered changes. Thus, the threshold α is a value which allows the determination of whether a person has entered the divided section. The threshold α is calculated by experiments beforehand and stored in the storage unit 31, for example.

When the main control unit 38 determines that the absolute value of the variation ΔS is not greater than the threshold α (No in Step ST207), the control unit 30 proceeds to Step ST208. At Step ST208, the main control unit 38 determines whether an elapsed time t from execution of Step ST207 is greater than a given time t0. When the main control unit 38 determines that the elapsed time t is not greater than the given time t0 (No in Step ST208), the main control unit 38 executes Step ST208 again. When the main control unit 38 determines that the elapsed time t is greater than the given time t0 (Yes in Step ST208), the main control unit 38 returns to Step ST202. That is, the control unit 30 stands by until the elapsed time t becomes greater than the given time t0. Thus, the control unit 30 repeatedly executes the steps, from Step ST202 to Step ST207, every given time t0. The main control unit 38 may determine whether an operation to end the crime prevention procedure is input to the operating unit 15 illustrated in FIG. 1 during this standby period. When the operation is input to the operating unit 15, the control unit 30 ends the execution of the series of procedures.

In this embodiment, the given time t0 is a constant value. As a result, the control unit 30 determines whether a person enters the imaging area A at constant time intervals. The shorter the given constant time t0 is, the more frequently the control unit 30 can determine whether a person (suspicious person) enters the imaging area A. Therefore, the mobile phone 1 can promote crime prevention more. In this case, the display control unit 34 may cause the projector 17 to always keep projecting the characteristic image. In this case, the control unit 30 repeatedly executes the steps, from Step ST204 to Step ST207. On the other hand, as the given constant time t0 is increased, the control unit 30 can decrease the number of operations of the imaging unit 11. Consequently, the mobile phone 1 can decrease electric power consumption thereof (of the mobile phone 1). That is, when the mobile phone 1 operates on a battery, the mobile phone 1 can suppress the decrease in operable time thereof (of the mobile phone 1).

When the main control unit 38 determines that the absolute value of the variation ΔS is greater than the threshold α (Yes in Step ST207), the control unit 30 proceeds to Step ST209. In Step ST209, the control unit 30 causes each of the units of the mobile phone 1 to perform the crime prevention operation. Specific examples of the crime prevention operation which are performed by the units according to instructions from the control unit 30 will be described. The display control unit 34 causes the projector 17 to emit visible light as the crime prevention operation. In this case, the projector 17 emits the visible light in a flashing manner. Or, the projector 17 may project a text image which warns a suspicious person on the subject (the wall 91 illustrated in FIG. 2 or the floor).

The display control unit 34 may cause the projector 17 to emit light toward one divided section where the absolution value of the variation ΔS is maximum among the divided sections, from the divided section A1 to the divided section A9, illustrated in FIG. 7. Under the condition illustrated in FIG. 7, the projector 17 emits light toward any one of the divided section A1, the divided section A4, and the divided section A7. In this way, the projector 17 emits light toward the person (suspicious person). Therefore, the mobile phone 1 can surprise the person (suspicious person) more.

The sound processing unit 33 causes the speaker 14 to output warning sound as the crime prevention operation. In addition, the sound processing unit 33 causes the microphone 12 to collect sound and acquires the collected sound from the microphone 12. Then, the storage unit 31 records a sound signal (data) thereof. The vibrator control unit 35 causes the vibrator 18 to vibrate. The imaging control unit 37 causes the image sensor 11*a* to image the imaging area A. Then, the storage unit 31 stores the image imaged by the image sensor 11*a*. When the imaging unit 11 can continuously perform imaging, a moving image in which images are continuous may be recorded in the storage unit 31.

The communicating unit 32 transmits a signal to a predetermined electronic device other than the mobile phone 1 as the crime prevention operation. For example, the communicating unit 32 transmits a mail to a mobile phone registered beforehand, or transmits a warning signal to an electronic device of a security service company. In this case, the communicating unit 32 may transmit a still image or a moving image which has been imaged by the image sensor 11*a*, or a sound signal (data) acquired from the microphone 12 to a predetermined electronic device, for example, in the form of an attachment to a mail. In this way, the still image or the moving image in which a suspicious person is likely to have been imaged, or the sound signal (data) in which suspicious person's voice is likely to have been included can be promptly transmitted. Consequently, the mobile phone 1 can prompt crime prevention more quickly.

The trigger signal outputting unit 36 outputs the trigger signal to an electronic device E other than the mobile phone 1 as the crime prevention operation. As a result, for example, a television starts operating when the television receives the trigger signal. An audio device starts and outputs sound when the audio device receives the trigger signal. A lighting apparatus starts illuminating when the lighting apparatus receives the trigger signal. The control unit 30 can surprise a suspicious person through these operations. Moreover, a personal computer is locked up, that is, the personal computer is protected with a password, for example, when the personal computer receives the trigger signal. As a result, the control unit 30 can protect information stored in the storage unit in the personal computer. At Step ST209, the control unit 30 may execute at least one operation among a plurality of the above-mentioned operations as the crime prevention operation.

Subsequently, at Step ST210, the main control unit 38 determines whether the operation to end the crime prevention operation has been input to the operating unit 15. The operation to end the crime prevention operation is an operation of inputting a password, for example. The control unit 30 returns to Step ST209 and causes the crime prevention operation to be continuously performed when the main control unit 38 determines that the operation to end the crime prevention operation has not been input to the operating unit 15 (No in Step ST210). The control unit 30 proceeds to Step ST211 when the main control unit 38 determines that the operation to end the crime prevention operation has been input to the operating unit 15 (Yes in Step ST210). At Step ST211, the control unit 30 ends the crime prevention operation, and thus the series of procedures is finished.

In a way that the control unit 30 executes the above-mentioned series of procedures, the control unit 30 determines whether or not there is a change in the imaging area A, for example, an intrusion of a person into the imaging area A, and causes each of the units in the mobile phone 1 to start the crime prevention operation when it is determined that there is the intrusion into the imaging area A. As a result, the mobile phone 1 can promote crime prevention. In addition, the mobile phone 1 need not be fixed when it is set up in the place (for example, balcony) where it is necessary to promote crime prevention, and also doesn't need a wired network. Therefore, the user can easily enforce the crime prevention by using the mobile phone 1. Moreover, the control unit 30 causes each of the units to execute the crime prevention operation as the predetermined operation when the absolute value of the variation of the second focal length information acquired by the imaging unit 11 with respect to the first focal length information which is set beforehand becomes greater than the threshold α. In this way, when a person enters the imaging area A located between the focal length detecting unit 11*b* and the subject as illustrated in FIG. 7, the mobile phone 1 can execute the crime prevention operation.

In the mobile phone 1, when the image sensor 11*a* performs imaging, the projector 17 projects the characteristic image on the imaging area A. As a result, for example, even when the shadow is casted to the imaging area A as time elapses, the focal length detecting unit 11*b* can recognize the characteristic image as the most characteristic portion. Therefore, since the focal length detecting unit 11*b* can detect the focal length of the same object (the characteristic image), the mobile phone 1 can decrease a fluctuation in the value detected by the focal length detecting unit 11*b*. Although the projector 17 can emit visible light, the projector 17 may emit invisible light. As a result, even when a suspicious person exists near the imaging area A, the suspicious person is less likely to realize that the projector 17 performs projection as at Step ST203 illustrated in FIG. 6.

Although the mobile phone 1 according to the present embodiment includes the projector 17 as the light-emitting unit, the mobile phone 1 may be equipped with a lighting system as the light-emitting unit instead of the projector 17. The lighting system emits light for illumination toward the imaging area A. As a result, even when the shadow is casted to the imaging area A as time elapses, the lighting system can decrease the shadow by illuminating. Therefore, the mobile phone 1 can decrease a fluctuation in the detection value of the focal length detecting unit 11*b*. The mobile phone 1 may cause the projector 17 to emit light for illumination, so that the projector 17 functions as the lighting system.

Although the present embodiment describes that the given time t0 is a constant value, the given time t0 may be a random value. When the given time t0 is a random value, the standby time of the control unit 30 changes each time the steps, including from Step ST202 to Step ST207, are repeated. That is, the control unit 30 determines t whether or not there is a person (suspicious person) who has entered the imaging area A at random timing. As a result, even if a suspicious person notices the existence of the mobile phone 1, the mobile phone 1 can make it difficult for the suspicious person to guess at which timing the control unit 30 determines whether or not there is a suspicious person who has entered the imaging area A.

When the value of the given time t0 is a constant value, the given time t0 may be one that changes every time the crime prevention procedure illustrated in FIG. 6 is executed. For example, the display control unit 34 causes the display unit 16 to display an image so as to allow the user to specify the value of this constant given time t0 at Step ST201. The user sees this query image, and inputs the value which specifies the given time t0 to the operating unit 15. The main control unit 38 acquires a signal from the operating unit 15, and sets a value of the given time t0 based on this signal. As a result, the mobile phone 1 can determine whether or not there is a suspicious person who has entered the imaging area A at the timing that the user desires.

For another example, the control unit 30 may change the value of the given time t0 in accordance with whether or not the mobile 1 is externally powered. The control unit 30 reduces the value of the given time t0 when the mobile phone 1 is being externally powered compared with when the mobile phone 1 is not being externally powered. The reason of this is that it is not necessary to consider battery's state of charge while the mobile phone 1 is being externally powered. As a result, when the mobile phone 1 is being externally powered, the control unit 30 can more frequently determine whether or not there is a person (suspicious person) who has entered the imaging area A. Possible values of the given time t0 include zero. When the given time t0 is zero, the mobile phone 1 can determine whether or not there is a person (suspicious person) who has entered the imaging area A more frequently. Consequently, the mobile phone 1 can further promote the crime prevention.

According to the present embodiment, the first focal length information is the information calculated by the imaging control unit 37 in the preliminary procedure. However, the first focal length information is not limited to the information that is calculated by the imaging control unit 37 in the preliminary procedure. For example, the first focal length information may be one which has been stored in the storage unit 31 beforehand. For example, when the imaging unit 11 images the same imaging area A every time the crime prevention procedure illustrated in FIG. 6 is executed, the main control unit 38 may use, as the first focal length information, the focal length information which was stored in the storage unit 31 when the last crime prevention procedure was executed. Alternatively, the imaging control unit 37 calculates the focal length information a plurality of times by repeatedly executing the steps, from Step ST202 to Step ST208 illustrated in FIG. 6. When the focal length information calculated through an n-th calculation by the imaging control unit 37 is defined as the second focal length information, the first focal length information may be focus information calculated through a directly previous calculation (an n−1-th calculation) by the imaging control unit 37. In this case, the control unit 30 determines whether or not there is a suspicious person based on the difference between the previous focal length information and the current focal length information. In such a case, the control unit 30 can determine whether or not there is a suspicious person even without executing the preliminary procedure.

According to the present embodiment, the storage unit 31 retains only the image imaged at Step ST204 by the image sensor 11*a* when the absolute value of the variation ΔS is greater than the threshold α, but does not retain the image imaged by the image sensor 11*a* when the absolute value of the variation ΔS is not greater than the threshold α. In other words, the storage unit 31 retains the image which was stored at Step ST205 immediately prior to Step ST207 illustrated in FIG. 6 in which Yes is determined. However, the storage unit 31 deletes the image which was stored at Step ST205 immediately prior to Step ST207 in which No is determined. As a result, the storage unit 31 can suppress a decrease in capacity.

However, the storage unit 31 may also retain the image imaged by the image sensor 11*a* before the absolute value of the variation ΔS becomes not greater than threshold α. For example, the storage unit 31 retains all of images imaged by the image sensor 11*a*. Then, at Step ST209, the communicating unit 32 transmits at least part of images retained in the storage unit 31. The at least part of images refers to images imaged for a given time around the time point at which the absolute value of the variation ΔS becomes greater than the threshold α. As a result, the communicating unit 32 can also transmit images other than the image imaged by the image sensor 11*a* immediately before Step ST209. In the case of this example, as for the images imaged by the image sensor 11*a* when the absolute value of the variation ΔS is determined to be not greater than the threshold α at Step S207, the storage unit 31 may delete those images after a given time elapses if the absolute value of the variation ΔS does not become greater than the threshold α within the given time. As a result, the storage unit 31 can suppress a decrease in free space.

(Second Embodiment)

Figure 8:
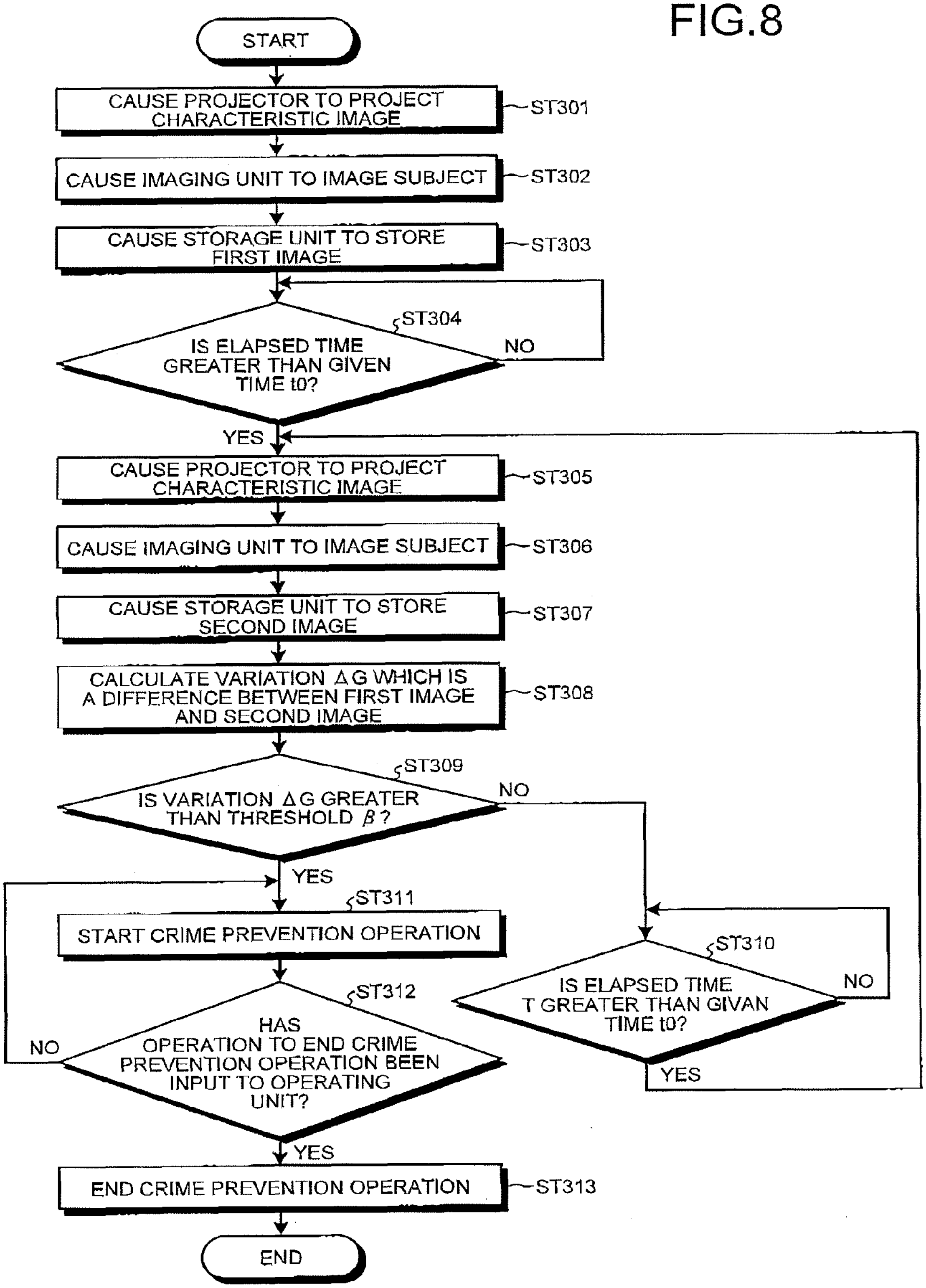
FIG. 8 is a flowchart illustrating a crime prevention procedure according to a second embodiment.

FIG. 8 is a flowchart illustrating a crime prevention procedure according to a second embodiment. A mobile phone according to the second embodiment has a similar configuration with the mobile phone 1 according to the first embodiment. However, procedures executed by a control unit 30 are different between the mobile phone 1 according to the first embodiment and the mobile phone according to the second embodiment. The control unit 30 according to the second embodiment is characterized in that it determines whether or not there is a person who has entered an imaging area A not by comparing pieces of focal length information but by comparing images.

At Step ST301 illustrated in FIG. 8, a display control unit 34 causes a projector 17 to project a characteristic image on at least a portion of the imaging area A as illustrated in FIG. 5. Subsequently, at Step ST302, an imaging control unit 37 causes an image sensor 11*a* to image a subject. Subsequently, at Step ST303, a storage unit 31 stores the image imaged by the image sensor 11*a* as a first image. In the present embodiment, the storage unit 31 need not store focal length information.

Subsequently, at Step ST304, a main control unit 38 determines whether an elapsed time t from execution of Step ST303 is greater than a given time t0. Like the first embodiment, the given time t0 may be a random value or a constant value. When the given time t0 is a random value, advantageous effects of the mobile phone in this case are the same as those which have been described with reference to the first embodiment. When the given time t0 is a constant value, advantageous effects of the mobile phone in this case are the same as those which have been described with reference to the first embodiment.

When the main control unit 38 determines that the elapsed time t is not greater than the given time t0 (No in Step ST304), the main control unit 38 executes Step ST304 again. When the main control unit 38 determines that the elapsed time t is greater than the given time t0 (Yes in Step ST304), the control unit 38 proceeds to Step ST305. That is, the control unit 30 stands by until the elapsed time t becomes greater than the given time t0. At Step ST305, the imaging control unit 37 causes the projector 17 to project the same characteristic image as the characteristic image projected at Step ST301 on the imaging area A. That is, the display control unit 34 executes the same procedure as Step ST301.

At Step ST306, the imaging control unit 37 causes the image sensor 11*a* to image the subject. Subsequently, at Step ST307, the storage unit 31 stores the image imaged by the image sensor 11*a* as a second image. Subsequently, at Step ST308, the main control unit 38 acquires the first image and the second image from the storage unit 31, and calculates a variation ΔG that is a difference between the first image and the second image by the image analysis. The variation ΔG is a difference which is caused because the second image changes when a person enters the imaging area A. Subsequently, at Step ST309, the main control unit 38 determines whether the variation ΔG is greater than a threshold β. The threshold β is a value which allows the determination of whether a person has entered the imaging area with based on color components of the image or the shape of the subject as illustrated in FIG. 7. The threshold β is calculated by experiments beforehand, for example, and stored in the storage unit 31.

When the main control unit 38 determines that the absolute value of the variation ΔG is not greater than the threshold β (No in Step ST309), the control unit 30 proceeds to Step ST310. At Step ST310, the main control unit 38 determines whether an elapsed time t from execution of Step ST309 becomes greater than a given time t0. When the main control unit 38 determines that the elapsed time t is not greater than the given time t0 (No in Step ST310), the control unit 38 executes Step ST310 again. When the main control unit 38 determines that the elapsed time t is greater than the given time t0 (Yes in Step ST310), the display control unit 34 returns to Step ST305. That is, the control unit 30 stands by until the elapsed time t becomes greater than the given time t0. The control unit 30 repeatedly executes the steps, from Step ST305 to step ST309, every given time t0. The main control unit 38 may determine whether the operation to end a crime prevention procedure is input to an operating unit 15 illustrated in FIG. 1, for example. When the operation is determined to be input to the operating unit 15, the control unit 30 ends the execution of a series of procedures.

When the main control unit 38 determines that the absolute value of the variation ΔG is greater than the threshold β (Yes in Step ST309), the main control unit 38 proceeds to Step ST311. Since procedures from Step ST311 to Step ST313 are the same procedures as the procedures from Step ST209 to Step ST211, respectively, illustrated in FIG. 6, a description about the same is not presented. When Step ST313 is executed, the control unit 30 ends execution of the series of procedures.

By executing the series of procedures described above, the control unit 30 acquires the image imaged when the execution of the crime prevention mode is started as the first image. The projector 17 projects the imaging area A with light to project the characteristic image as a predetermined image. The control unit 30 causes the image sensor 11 to image the characteristic image projected by the projector 17, and sets the image as the first image. The projector 17 may project the characteristic image with invisible light. As a result, even when a suspicious person exists near the imaging area A, the mobile phone can decrease the likelihood that the suspicious person becomes aware of projection by the projector 17 at step ST305.

Moreover, the control unit 30 causes the storage unit 31 to store the second image imaged by the image sensor 11*a* by executing the series of procedures described above. In this case, the storage unit 31 may store the second image when the variation ΔG is greater than of the threshold β, and may not store the second image from the first when variation ΔG is not greater than the threshold β. In other words, the storage unit 31 retains the image which was stored at Step ST307 immediately prior to Step ST309 illustrated in FIG. 8 in which Yes is determined. And, the storage unit 31 deletes the image which was stored at Step ST307 immediately prior to Step ST309 in which No is determined. As a result, the storage unit 31 can suppress the decrease in free space. Alternatively, the storage unit 21 may delete the second image imaged when the variation ΔG is not greater than the threshold β after a given time elapses if the variation ΔG does not become greater than the threshold β0 within the given time. As a result, the storage unit 31 can suppress the decrease in free space. The image sensor 11*a* may be able to continuously perform imaging. In this case, the first image and the second image are moving images.

The mobile phone according to the present embodiment of the above-mentioned configuration has the same advantageous effects as the mobile phone 1 according to the first embodiment. In addition, since the mobile phone according to the present embodiment compares the images imaged by the image sensor 11*a*, it can more precisely and accurately determined whether or not there is a suspicious person within the imaging area, according to the precision of the image analysis. Determining whether or not there is a suspicious person based on the comparison of focal lengths may take less time than determining whether or not there is a suspicious person based on the comparison using the image analysis. Therefore, the mobile phone 1 according to the first embodiment may be superior in rapidity of the determination of whether or not there is suspicious person within the imaging area A.

INDUSTRIAL APPLICABILITY

As mentioned above, the mobile electronic device and the method for crime prevention according to the present invention is useful for a mobile electronic device with crime prevention function.

The invention claimed is:

1. A mobile electronic device, comprising:
- a display unit;
- a light-emitting unit configured to emit light; and
- a control unit configured to perform control such that a predetermined operation is executed when a variation between first information and second information is greater than a threshold, the first information and the second information being obtained with respect to an area to which the light-emitting unit emits the light, wherein
- said light is a characteristic image in which a boundary between different colors is clear,
- the control unit is configured to perform a preliminary procedure before a crime prevention procedure, and
- in the preliminary procedure, the control unit is configured to
  - cause the display unit to display a query whether an appearance of a subject within the area changes with time, and
  - in response to a user's response to the query, cause the light-emitting unit to emit the characteristic image to the area.

2. The mobile electronic device according to claim 1, further comprising a detecting unit configured to detect a distance to the characteristic image in the area based on a sharpness of the boundary, wherein
- the first information is with respect to a distance detected by the detecting unit at a first time, and
- the second information is with respect to a distance detected by the detecting unit after a second time.

3. The mobile electronic device according to claim 2, wherein
- the control unit is configured to perform control in a crime prevention mode, and
- the first information is obtained when execution of the crime prevention mode is started.

4. The mobile electronic device according to claim 2, wherein
- the detecting unit is configured to detect the distance for each of a plurality of divided sections obtained by dividing the area into the plurality of divided sections, and
- the control unit is configured to determine whether the variation is greater than the threshold for each of the divided sections, and perform the control such that the predetermined operation is performed when the variation is greater than the threshold for any one of the divided sections.

5. The mobile electronic device according to claim 4, wherein
- the control unit is configured to cause the light-emitting unit to emit light to the divided section in which the variation is greater than the threshold as the predetermined operation.

6. The mobile electronic device according to claim 1, further comprising an imaging unit configured to image the area, wherein
- the first information is with respect to a first image of the characteristic image imaged by the imaging unit at a first time, and
- the second information is with respect to a second image of the characteristic image imaged by the imaging unit after a second time, wherein
- the first information and the second information are determined based on the sharpness of the boundary of the characteristic image imaged by the imaging unit.

7. The mobile electronic device according to claim 6, wherein
- the control unit is configured to perform control in a crime prevention mode, and
- the first image is an image imaged when execution of the crime prevention mode is started.

8. The mobile electronic device according to claim 6, wherein
- the light-emitting unit is configured to project a predetermined image.

9. The mobile electronic device according to claim 8, wherein
- the control unit is configured to set the predetermined image projected by the light-emitting unit as the first image.

10. The mobile electronic device according to claim 8 , wherein
- the light-emitting unit is configured to project the predetermined image with invisible light.

11. The mobile electronic device according to claim 6, wherein
- the imaging unit is configured to perform imaging randomly or at a constant time interval.

12. The mobile electronic device according to claim 11, wherein
- the constant time interval is set to be shorter when the mobile electronic device is externally powered than when the mobile electronic device is not externally powered.

13. The mobile electronic device according to claim 6, further comprising a storage unit, wherein
- the control unit is configured to cause the storage unit to store the second image imaged by the imaging unit.

14. The mobile electronic device according to claim 13, wherein the control unit is configured to cause the storage unit to store the second image imaged when the variation is greater than the threshold, and not store the second image imaged when the variation is not greater than the threshold.

15. The mobile electronic device according to claim 13, wherein the control unit is configured to cause the storage unit to delete the second image imaged when the variation is not greater than the threshold after a given time elapses if the variation does not become greater than the threshold within the given time.

16. The mobile electronic device according to claim 6, wherein the imaging unit is configured to continuously perform imaging, and the second image is a moving image.

17. The mobile electronic device according to claim 1, further comprising a sound collecting unit configured to acquire sound, wherein the sound collecting unit is controlled such that sound is collected since the variation becomes greater than the threshold.

18. The mobile electronic device according to claim 1, further comprising a communicating unit, wherein, the communicating unit is configured to perform communication when the variation becomes greater than the threshold.

19. The mobile electronic device according to claim 1, further comprising an imaging unit configured to image the area, wherein in the preliminary procedure, the control unit is configured to further obtain the first information with respect to a first image of the characteristic image imaged by the imaging unit, and in the crime prevention procedure, the control unit is configured to determine whether the preliminary procedure has been performed, in response to a determination that the preliminary procedure has been performed, cause the light-emitting unit to emit the characteristic image to the area, obtain the second information with respect to a second image of the characteristic image imaged by the imaging unit, and cause the predetermined operation to be executed when the variation between the first information and the second information is greater than the threshold.

20. A method for crime prevention, the method performed by a mobile electronic device including a light-emitting unit, the method comprising:

emitting light to an area by the light-emitting unit;

obtaining first information with respect to the area;

obtaining second information with respect to the area; and performing control such that a predetermined operation is executed when a variation between the first information and the second information is greater than a threshold, wherein the light is a characteristic image in which a boundary between different colors is clear, the mobile electronic device further includes a display unit, the method further comprises performing a preliminary procedure before a crime prevention procedure, and the preliminary procedure comprises:

displaying, by the display unit, a query whether an appearance of a subject within the area changes with time, and in response to a user's response to the query, emitting, by the light-emitting unit, the characteristic image to the area.

21. The method for crime prevention according to claim 20, wherein the mobile electronic device further includes an imaging unit, the method further comprising:

imaging the area by the imaging unit, wherein the first information is with respect to a first image of the characteristic image imaged by the imaging unit at a first time, and the second information is with respect to a second image of the characteristic image imaged by the imaging unit after a second time, wherein the first information and the second information are determined based on a sharpness of the boundary of the characteristic image imaged by the imaging unit.

22. The method for crime prevention according to claim 20, wherein the mobile electronic device further includes an imaging unit configured to image the area, the preliminary procedure further comprises:

obtaining the first information with respect to a first image of the characteristic image imaged by the imaging unit, and the crime prevention procedure comprises:

determining whether the preliminary procedure has been performed, in response to a determination that the preliminary procedure has been performed, emitting, by the light-emitting unit, the characteristic image to the area, obtaining the second information with respect to a second image of the characteristic image imaged by the imaging unit, and causing the predetermined operation to be executed when the variation between the first information and the second information is greater than the threshold.

* * * * *